United States Patent
Kaltenborn

(10) Patent No.: US 8,896,977 B2
(45) Date of Patent: Nov. 25, 2014

(54) METHOD FOR OPERATING AN ELECTRICAL POWER SUPPLY NETWORK

(75) Inventor: Uwe Kaltenborn, Regensburg (DE)

(73) Assignee: Schneider Electric Sachsenwerk GmbH, Regensburg (DE)

( * ) Notice: Subject to any disclaimer, the term of this patent is extended or adjusted under 35 U.S.C. 154(b) by 269 days.

(21) Appl. No.: 13/387,123

(22) PCT Filed: May 11, 2010

(86) PCT No.: PCT/EP2010/056443
§ 371 (c)(1),
(2), (4) Date: Feb. 29, 2012

(87) PCT Pub. No.: WO2011/012341
PCT Pub. Date: Feb. 3, 2011

(65) Prior Publication Data
US 2012/0188676 A1    Jul. 26, 2012

(30) Foreign Application Priority Data

Jul. 29, 2009 (DE) .......................... 10 2009 035 166

(51) Int. Cl.
  *H02H 3/08* (2006.01)
  *H02H 7/30* (2006.01)
  *H02J 3/04* (2006.01)
  *H02H 3/02* (2006.01)

(52) U.S. Cl.
  CPC .. *H02H 7/30* (2013.01); *H02J 3/04* (2013.01); *H02H 3/021* (2013.01)
  USPC .......................................... 361/93.1; 361/111

(58) Field of Classification Search
  CPC ......... H02H 3/023; H02H 3/08; H02H 3/066; H02H 3/335; H02H 7/222; H01H 81/00; H01H 79/00
  USPC ............................................. 361/111, 63, 93.1
  See application file for complete search history.

(56) References Cited

U.S. PATENT DOCUMENTS 2,345,033 A * 3/1944 Claybourn .................... 361/611
3,035,181 A * 5/1962 Laudel, Jr. ....................... 307/87

(Continued)

FOREIGN PATENT DOCUMENTS

DE  4108049 A1   9/1992
EP  0508177 A2   10/1992

OTHER PUBLICATIONS

German Office Action mailed Sep. 17, 2012.

(Continued)

*Primary Examiner* — Rexford Barnie
*Assistant Examiner* — Angela Brooks
(74) *Attorney, Agent, or Firm* — Harness, Dickey & Pierce, P.L.C.

(57) ABSTRACT

A method for operating an electrical power supply network is described. The power supply network has several levels of different voltages. The levels are interconnected by switches. A first switch is made so that the maximum interruptible short-circuit current of the first switch is smaller than the maximum flowing short-circuit current. In the event of failure, a test is made as to whether the short-circuit current presently flowing through the first switch is smaller than the maximum interruptible short-circuit current. The first switch will remain closed if this is not the case, and the first switch will be opened if this is the case.

21 Claims, 2 Drawing Sheets

(56) References Cited

U.S. PATENT DOCUMENTS

| | | | |
|---|---|---|---|
| 5,103,365 A | | 4/1992 | Uchida et al. |
| 5,216,352 A | * | 6/1993 | Studtmann et al. ........... 323/241 |
| 6,424,058 B1 | * | 7/2002 | Frech et al. .................. 307/109 |
| 6,592,412 B1 | * | 7/2003 | Geil et al. ......................... 440/6 |
| 7,974,058 B2 | * | 7/2011 | Maigret et al. ................. 361/63 |
| 7,989,977 B2 | * | 8/2011 | Crane ............................... 307/8 |
| 2005/0200205 A1 | * | 9/2005 | Winn et al. ..................... 307/64 |
| 2008/0024142 A1 | * | 1/2008 | Opfer et al. .................. 324/555 |
| 2008/0091961 A1 | * | 4/2008 | Cranford et al. ............. 713/300 |
| 2009/0040673 A1 | * | 2/2009 | Maigret et al. ................. 361/63 |
| 2009/0228223 A1 | * | 9/2009 | Liu et al. ......................... 702/59 |
| 2012/0249070 A1 | * | 10/2012 | Sellner et al. ................. 320/109 |
| 2013/0024039 A1 | * | 1/2013 | Gotz et al. .................... 700/292 |
| 2013/0271879 A1 | * | 10/2013 | Andersen et al. ............... 361/20 |

OTHER PUBLICATIONS

Juellcher H-W et al., "Various switchgear, its breaker technologies and their application in cement plants", XP010918639, IEEE pp. 1-20, Apr. 2006.

International Search Report and Written Opinion of Searching Authority.

* cited by examiner

METHOD FOR OPERATING AN ELECTRICAL POWER SUPPLY NETWORK

PRIORITY STATEMENT

This application is the national phase under 35 U.S.C. §371 of PCT International Application No. PCT/EP2010/056443 which has an International filing date of May 11, 2010, which designates the United States of America, and which claims priority on German patent application number DE 10 2009 035 166.3 filed Jul. 29, 2009, the entire contents of each of which are hereby incorporated herein by reference.

FIELD

At least one embodiment of the invention generally relates to a method for operating an electrical power supply network, as well as to a corresponding electrical power supply network and to a switch for such an electrical power supply network.

BACKGROUND

A power supply supply network comprises several levels of differing voltages, wherein these levels are connected via switches. The switches are designed such that the maximum interruptible short-circuit current of the switch is higher than the maximum flowing short-circuit current. As a result of this specification, the switch can be opened in case of a failure, so that the existing short-circuit current is interrupted.

SUMMARY

At least one embodiment of the invention is directed to a method and/or a power supply network.

At least one embodiment of the invention is directed to a switch for such a power supply network.

At least one embodiment of the invention starts with a first switch which is designed such that the maximum interruptible short-circuit current of the first switch is smaller than the maximum flowing short-circuit current. In at least one embodiment of the method according to the invention, a test is made in the event of a failure to determine whether the short-circuit current presently flowing through the first switch is lower than the maximum interruptible short-circuit current. If that is not the case, the first switch remains closed. If that is the case, the first switch is opened.

The switch according to at least one embodiment of the invention can be embodied smaller than a known switch of the same type. Among other things, this represents a cost saving. The complete power supply network can furthermore have a simpler design and can be more flexible as a result of the switch according to at least one embodiment of the invention.

According to one advantageous embodiment of the invention, a second switch is provided which on arranged at a higher level than the first switch. This second switch is embodied in such a way that the maximum interruptible short-circuit current of the second switch is smaller than the maximum flowing short-circuit current. In case of a failure, a test is made to determine whether the short-circuit current actually flowing through the second switch is smaller than the maximum interruptible short-circuit current. If that is not the case, the second switch remains closed, whereas the second switch is opened if that is the case.

This modification has the advantage that in case of a failure the second switch is opened, if applicable, while the first switch remains closed. As a result, the short-circuit current is interrupted on the whole. This principle can be used over several levels of the power supply network.

With some embodiments of the invention, the test to determine whether the short-circuit current presently flowing through the first switch is smaller than maximum interruptible short-circuit current is realized by the first or the second switch itself and/or the opening or leaving closed of the first or second switch is realized by the first or the second switch itself. This has the advantage that the switches operate independent of each other, so that no higher-level communication is required.

BRIEF DESCRIPTION OF THE DRAWINGS

Additional features, options for use and advantages of the invention follow from the description below of example embodiments of the invention which are illustrated in the Figures. All herein described or illustrated features either by themselves or in any optional combination form the subject matter of the invention, regardless of how they are combined in the patent claims or the references back, as well as independent of their formulation and/or representation in the specification or in the drawing.

DETAILED DESCRIPTION OF THE EXAMPLE EMBODIMENTS

Figure 1:
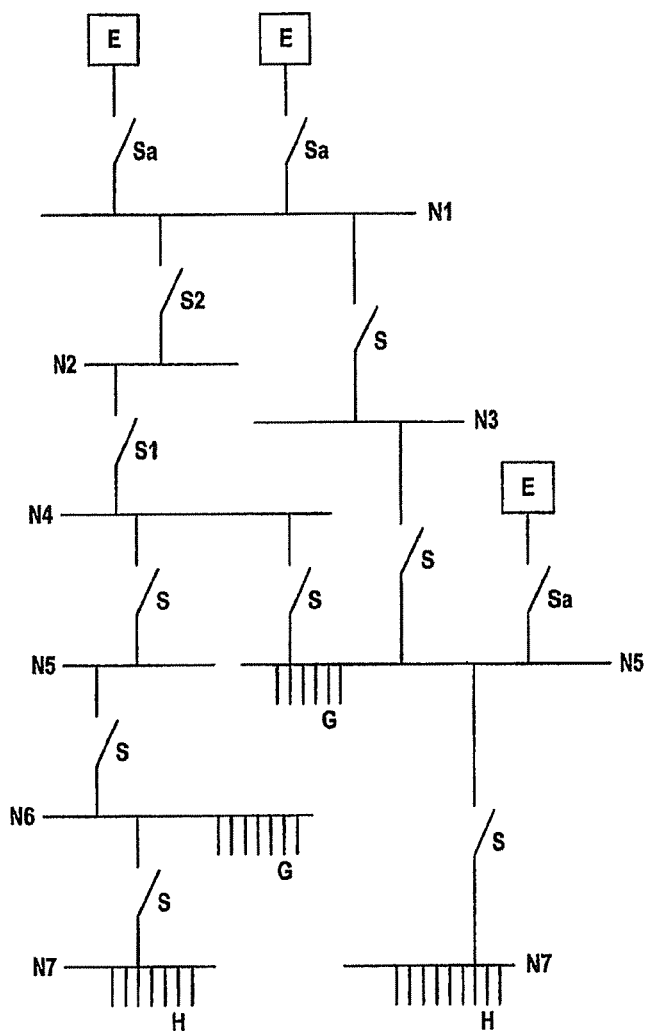
FIG. 1 shows a schematic circuit diagram for an exemplary embodiment of an electrical power supply network.

FIG. 1 shows an electrical power supply network used to transmit electrical power from one or several power producers to one or several power consumers. The electrical voltage of the power supply network is transformed step-by-step in the electrical power supply network from a high level via one or several intermediate levels to a low level. Transformers or other electrical equipment that is not shown in FIG. 1, for example, are provided for the transformation of power between the levels. The feed-in of power by the power producers can take place at all levels while the power consumers can tap the power at the low level or if applicable at the intermediate levels.

FIG. 1 shows examples of two power producers E which are respectively connected via a switch Sa to a first voltage level N1 of the power supply network and which feed power into the supply network. This first level N1 is connected via additional switches S, S1, S2 to additional levels N2, N3, N4, N5, N6, N7 of the voltage for the power supply network. The first level N1 represents the high level and the seventh level N7 the low level for the voltage of the power supply network. The seventh level N7, for example, can be a 220 Volt alternating-voltage network.

A different power producer E which feeds power into the supply network is connected, for example, to the fifth level N5 via a switch Sa. As previously mentioned, other levels of the power supply network can also be connected to one or several additional power producers for feeding in power.

A plurality of households H which draw power from the electrical power supply network are connected to the seventh level N7. Furthermore connected to the fifth and sixth levels N5, N6 are a plurality of commercial consumers G, for example industrial production plants and the like. These consumers G also draw electrical power from the power supply network, meaning at a higher level than the households H, for example via a 400 Volt three-phase network.

The switches Sa, S, S1, S2 for the power supply network according to FIG. 1 are intended to shift to the opened state in case of a failure in the electrical power supply network, for example a short circuit, so that possibly occurring short-circuit currents are interrupted. Each of the switches Sa, S, S1, S2 is designed so as to be able to interrupt a specific maximum short-circuit current. This current represents a parameter for the switch and is referred to in the following as "maximum interruptible short-circuit current."

In contrast thereto, the current which flows during an actual short circuit in the most unfavorable case through one of the switches Sa, S, S1, S2 is referred to as "maximum flowing short-circuit current." This current depends on the complete power supply network and, in particular, on the connected power supply producers E.

Finally, there is also the current which actually flows through one of the switches Sa, S, S1, S2 during an actual short circuit. This current is referred to as "actually flowing short-circuit current." The actually flowing short-circuit current is smaller or at most equal to the maximum flowing short-circuit current. The value of actually flowing short-circuit current depends on the actual state of the complete power supply network, on the type of failure that occurs in the network operation, and the like.

The switches Sa of the power supply network which are directly connected to a power producer E are dimensioned such that the generated short-circuit capacity of the associated power producer E can be shut down securely. The maximum interruptible short-circuit current in these switches Sa is thus larger than the maximum flowing short-circuit current. If several power producers are switched parallel, additional switches in the form of lateral and/or longitudinal connections can also be used.

For the remaining switches S, S1, S2 which are not connected directly to a power producer E, the following applies: At least one, preferably a plurality of the switches S, S1, S2 are designed such that the maximum interruptible short-circuit current of the switch is smaller than the maximum flowing short-circuit current. In the most unfavorable case, the switch is therefore not in the position to interrupt the short-circuit current that flows during the most unfavorable case when a short circuit occurs. As a result, the respective switch must remain closed in the most unfavorable case.

It is not necessary that all of the aforementioned switches S, S1, S2 can interrupt the same maximum short-circuit current. Instead, the switches S, S1, S2 can differ insofar that different switches also carry different maximum interruptible short-circuit currents. For this, it is advantageously provided that those switches which are arranged between higher levels can interrupt a larger short-circuit current than those switches which are arranged between lower voltage levels of the power supply network.

Figure 2:
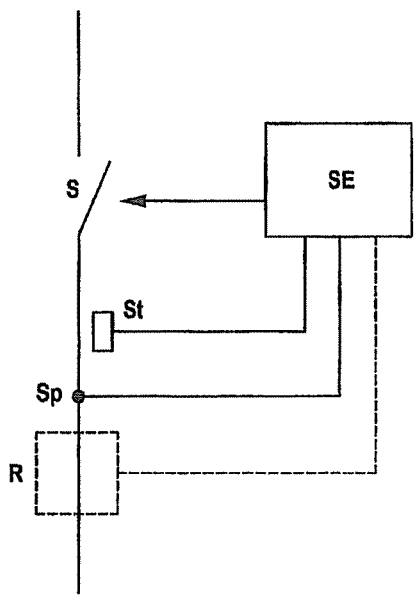
FIG. 2 shows a schematic block diagram of a switch for the power supply network shown in FIG. 1.

FIG. 2 illustrates the switch S. The following explanations for this switch S correspondingly also apply to the switches S1 and S2.

The switch S, and/or the electrical line connected thereto, is connected to one or several devices which help determine the actual electrical power flowing through the switch S. In FIG. 2, for example, the electrical line connected to the switch S is connected to a current sensor St and/or to a voltage tap Sp.

The switch S and/or the electrical line connected thereto can furthermore be connected to one or several devices which aid in detecting the direction of the electrical power that actually flows through the switch S, wherein a device R is shown as example for this in FIG. 2.

In particular, the momentary effective value of the electrical power can be important for the further action. This effective value can be determined with the aid of the course of the current and the voltage course over time, or with the aid of the current course over time and the associated phase angle.

The output signals from the aforementioned devices, meaning the output signals from the current sensor St, the voltage tap Sp etc., mentioned as examples, are conducted to a control unit SE. This control unit SE is furthermore connected to the switch S.

In the control unit SE, the previously explained maximum interruptible short-circuit current is stored which can be interrupted by the connected switch S. As mentioned before, this is a switch parameter which can be determined ahead of time. One or several criteria are furthermore stored in the control unit SE which can be used by the control unit SE to identify a failure in the power supply network, for example a short circuit in the power supply network, or an existing residual current, or the like. For example, this can be a current limit value which cannot be exceeded under normal operating conditions and the existence of which indicates a failure. In the same way, it can also relate to a steep increase in the current which cannot be reached under normal operating conditions and thus indicates a failure.

In dependence on the stored values, as well as in dependence on the aforementioned input signals, the control unit SE can control the switch S to move to its opened and thus non-conducting state or to its closed and thus conducting state.

We now proceed on the assumption that the power supply network shown in FIG. 1 is operational, that it contains at least a first and a second switch S1, S2 as shown in FIG. 2, wherein these switches are in the closed state, and that the second switch S2 is positioned between two higher levels than the first switch S1. Furthermore assumed is the existence of at least one power producer E and one power consumer G, H and that the switch Sa which is directly connected to the power producer H is closed.

For example, if for any reason the first switch S1 shown in FIG. 2, which is located on a level below that of the second switch S2, assumes a state as a result of a short circuit flowing somewhere in the power supply network, which state represents a failure in the power supply network for the associated control unit SE based on the stored values, then the control unit SE assigned to the switch S1 tests whether the connected switch S1 is capable of interrupting the short-circuit current presently flowing through this switch. For this, the control unit SE compares the short-circuit current presently flowing through the switch S1 to the maximum interruptible short-circuit current for the switch S1. The control unit SE furthermore checks the direction of the current flow.

If the short-circuit current that presently flows through the switch S1 is smaller than the maximum interruptible short-circuit current for the switch S1, then the control unit SE moves the switch S1 to the opened state. The current flow through the switch S1 is thus interrupted and the failure of the power supply network insofar cannot cause any more damage.

However, if the short-circuit current presently flowing through the switch S1 is larger than the maximum short-circuit current that can be interrupted by the switch S1, the switch S1 cannot be moved to the opened state. In that case, the associated control unit SE leaves the switch S1 in the closed state and the current flow is not interrupted.

All switches S, S1, S2 continuously test whether a failure has occurred in the power supply network, in the manner as explained in connection with the switch S1. This testing by the individual switches S, S1 and S2 occurs independently.

If the control unit SE assigned to the switch S2 determines that a failure has occurred in the power supply network, the control unit SE tests whether the connected switch S2 can interrupt the short-circuit current presently flowing through this switch. For this, the control unit SE compares the short-circuit current presently flowing through the switch S2 to the maximum interruptible short-circuit current for the switch S2.

If the short-circuit current presently flowing through the switch S2 is smaller than the maximum interruptible short-circuit current for the switch S2, then the control unit SE controls the switch S2 to move to the opened state. The current flow through the switch S2 is thus interrupted and the failure of the power supply network can insofar no longer cause damage.

However, if the short-circuit current that presently flows through the switch S2 is larger than the maximum short-circuit current that can be interrupted by the switch S2, the switch S2 cannot be moved to the opened state. In that case, the associated control unit SE leaves the switch S2 in the closed state and the current flow is not interrupted.

Three situations can thus occur for the above-described example:

In a first case, the two switches S1, S2 interrupt the current flow essentially at the same time. This first case is of a rather theoretic nature and occurs almost never. Instead, in reality one of the two switches will always switch first and the other switch in that case will no longer switch. The two switches S1, S2, especially the response behavior of the two switches S1, S2, should advantageously be preset ahead of time so that in all cases only one of the switches S1 or S2 will be switched.

In a second case, it is assumed that the switch S2 can interrupt a larger short-circuit current than the switch S1. As a result, the switch S2 can still interrupt the current flow while the switch S1 can no longer do so.

In a third case, both switches S1 and S2 cannot interrupt the current flow.

In the first two cases, the current flow through the switches S1, S2 is interrupted. Following this, the reason for the failure, meaning in particular the short circuit, can be corrected or at least isolated. A failure isolation is understood to mean that the section of the power supply network where the failure occurred and thus the damaged section is shut down, such that the remaining power supply network can continue to operate normally. As soon as the control units SE for the switches S1, S2 have identified how to correct the failure or isolate it, the switches S1, S2 can be closed once more. As a result, the power supply network returns once more to normal operating conditions.

To detect whether a failure has been corrected or at least isolated, the control unit SE again moves the associated switch S to the closed state. If the failure still exists, this is detected immediately by the control unit SE, as explained before, and the control unit SE again opens the switch S immediately. The associated switch S thus remains in the closed state only if the failure has been corrected or at least isolated and the control unit SE therefore no longer can detect a failure.

In the third case, the current flow through the two switches S1, S2 is maintained, for example, until one of the switches Sa that is directly connected to a power producer E and/or one of the power producers E themselves detects the failure in the power supply network and interrupts and/or reduces the electrical power fed into the power supply network. If this interruption or reduction is sufficient to ensure that the short-circuit current presently flowing through one of the two switches S1, S2 is smaller than the associated maximum interruptible short-circuit current, the associated control unit SE moves the corresponding switch S1, S2 to its opened state, so that the current flow is interrupted. As previously explained, a failure correction or a failure isolation can then be identified by the control units SE for the switches S1, S2 and the switches S1, S2 can be closed accordingly, whereupon a normal operating state for the power supply network is obtained once more.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A method for operating an electrical power supply network, the power supply network including a plurality of levels with different voltages, the levels being connected via switches, a first of the switches being embodied such that a maximum interruptible short-circuit current of the first switch is relatively smaller than a maximum flowing short-circuit current, the method comprising:

carrying out a test, in a case of a failure, to determine whether the short-circuit current presently flowing through the first switch is relatively smaller than the maximum interruptible short-circuit current; and maintaining the first switch in the closed position upon determining, from the test, that the short-circuit current presently flowing through the first switch is not relatively smaller than the maximum interruptible short-circuit current; and opening the first switch to an open position upon determining, from the test, that the short-circuit current presently flowing through the first switch is relatively smaller than the maximum interruptible short-circuit current.

2. The method according to claim 1, wherein the test to determine whether the short-circuit current presently flowing through the first switch is relatively smaller than the maximum interruptible short-circuit current is carried out by the first switch.

3. The method according to claim 1, wherein the opening of the first switch or the maintaining of the first switch in the closed position is performed by the first switch.

4. The method according to claim 1, wherein the detection of the failure is carried out by the first switch.

5. The method according to claim 1, wherein a second of the plurality of switches is provided, arranged relatively higher than the first switch with respect to the levels, the second switch being embodied such that the maximum interruptible short-circuit current of the second switch is relatively smaller than the maximum flowing short-circuit current, wherein the method includes carrying out a test, in a case of a failure resulting in a closure of the second switch, to make a second determination of whether the short-circuit current presently flowing through the second switch is relatively smaller than the maximum interruptible short-circuit current, wherein the second switch remains closed if upon the second determination not being made and wherein the second switch is opened upon the second determination being made.

6. The method according to claim 5, wherein the test to make a second determination of whether the short-circuit current presently flowing through the second switch is relatively smaller than the maximum interruptible short-circuit current is carried out by the second switch.

7. The method according to claim 5, wherein the opening of the second switch or the maintaining of the second switch in the closed position is carried out by the second switch.

8. The method according to claim 5, wherein the detection of the failure resulting in a closure of the second switch is carried out by the second switch.

9. The method according to claim 5, wherein the second switch is opened while the first switch remains closed.

10. An electrical power supply network, the power supply network including a plurality of levels with different voltages, the electrical power supply network comprising:
   a plurality of switches, connecting the levels, a first switch of the plurality of switches being embodied such that a maximum interruptible short-circuit current of the first switch is relatively smaller than a maximum flowing short-circuit current; and
   at least one device to carry out a test, in case of a failure, to determine whether the short-circuit current presently flowing through the first switch is relatively smaller than the maximum interruptible short-circuit current; and to influence the first switch in such a way that the first switch remains closed upon the at least one device determining, from the test, that the short-circuit current presently flowing through the first switch is not relatively smaller than the maximum interruptible short-circuit current and to influence the first switch in such a way that the first switch is opened upon the at least one device determining, from the test, that the short-circuit current presently flowing through the first switch is relatively smaller than the maximum interruptible short-circuit current.

11. A switch for an electrical power supply network, the power supply network including a plurality of levels with different voltages, the levels being connected via a plurality of switches including the switch, the switch being embodied such that a maximum interruptible short-circuit current of the switch is relatively smaller than a maximum flowing short-circuit current, wherein the switch remains closed upon a test being carried out, in case of a failure, which determines that the short-circuit current presently flowing through the switch is not relatively smaller than the maximum interruptible short-circuit current, and wherein the switch is opened the test determining that the short-circuit current presently flowing through the switch is relatively smaller than the maximum interruptible short-circuit current.

12. A power supply network according to claim 10, wherein the at least one device to test whether the short-circuit current presently flowing through the switch is relatively smaller than the maximum interruptible short-circuit current includes the switch.

13. The power supply network according to claim 10, wherein the at least one device to at least one of open and maintain the switch closed includes the switch.

14. The power supply network according to claim 10, wherein the at least one device to detect a failure is assigned to the switch.

15. The method according to claim 2, wherein the opening of the first switch or the maintaining of the first switch in the closed position is performed by the first switch.

16. The method according to claim 2, wherein the detection of the failure is carried out by the first switch.

17. The method according to claim 2, wherein a second of the plurality of switches is provided, arranged relatively higher than the first switch with respect to the levels, the second switch being embodied such that the maximum interruptible short-circuit current of the second switch is relatively smaller than the maximum flowing short-circuit current, wherein the method includes carrying out a test, in a case of a failure resulting in a closure of the second switch, to make a second determination of whether the short-circuit current presently flowing through the second switch is relatively smaller than the maximum interruptible short-circuit current, wherein the second switch remains closed if upon the second determination not being made and wherein the second switch is opened upon the second determination being made.

18. The method according to claim 17, wherein the test to make a second determination of whether the short-circuit current presently flowing through the second switch is relatively smaller than the maximum interruptible short-circuit current is carried out by the second switch.

19. The method according to claim 17, wherein the opening of the second switch or the maintaining of the second switch in the closed position is carried out by the second switch.

20. The method according to claim 17, wherein the detection of the failure resulting in a closure of the second switch is carried out by the second switch.

21. The method according to claim 17, wherein the second switch is opened while the first switch remains closed.

* * * * *